(No Model.)

J. A. GRAVES.
BUTTER WORKER.

No. 395,049. Patented Dec. 25, 1888.

WITNESSES:
J. H. Clark
C. Sedgwick

INVENTOR:
J. A. Graves
BY Munn & Co.
ATTORNEYS.

United States Patent Office.

JULIA A. GRAVES, OF FAIR HAVEN, VERMONT.

BUTTER-WORKER.

SPECIFICATION forming part of Letters Patent No. 395,049, dated December 25, 1888.

Application filed August 29, 1888. Serial No. 284,051. (No model.)

*To all whom it may concern:*

Be it known that I, JULIA A. GRAVES, of Fair Haven, in the county of Rutland and State of Vermont, have invented a new and useful Improvement in Butter-Workers, of which the following is a full, clear, and exact description.

The object of my invention is to produce a cheap and simple butter-worker adapted to puncture the butter, so that salt may be introduced and buttermilk extracted, also for cutting the butter into desired portions, molding it into balls, and stamping; and it consists in the parts which will be hereinafter described, and pointed out in the claims.

Reference is to be had to the accompanying drawings, forming a part of this specification, in which similar letters of reference indicate corresponding parts in both the views.

Figure 1:
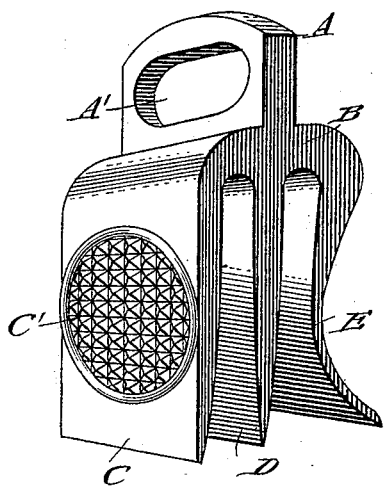
Figure 2:
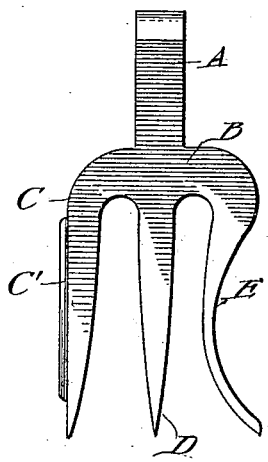

Figure 1 represents a perspective view of my invention, and Fig. 2 is a front elevation.

The device is preferably formed of a single piece of wood, and it consists of a handle A, having an opening, A', a back, B, and blades C, D, and E. A butter-stamp, C', is cut into the face of the straight outer blade, C. The outer blade, E, is longitudinally concaved on its outer side, and its outer end is curved outward. The middle blade, D, is straight. The outer edge of each blade is square—*i. e.*, at right angles to its longitudinal plane—and each edge is sharp.

The operation is as follows: By inserting the blades of the device into the butter the cavities containing buttermilk may be punctured and that fluid removed. The butter is also punctured to receive the salt, and salt placed into the openings or recesses thus formed is evenly distributed throughout the butter. The concaved side of the blade E is adapted to mold the butter into balls. The stamp C' on the outer side of the blade C is for stamping the butter. The blades are also adapted for cutting the butter into sections or cakes of any desired size.

Before using the worker it should be dipped first in hot water and then in cold water. This process prevents the butter from adhering to the wood.

Having thus fully described my invention, I claim as new and desire to secure by Letters Patent—

1. A butter-worker consisting of a handle provided with three blades of approximately equal length, arranged side by side, one of the outer blades being concaved on its outer side, substantially as shown and described.

2. A butter-worker formed from a single piece of wood, consisting of a handle provided with three blades arranged side by side, one of the outer blades being concaved on its outer side, substantially as shown and described.

3. A butter-worker formed from a single piece of wood, consisting of a handle provided with three blades arranged side by side, one of the outer blades being concaved on its outer side, the outer end of said concaved blade being curved outward, and the outer side of the other outer blade being provided with a stamp, substantially as shown and described.

JULIA A. GRAVES.

Witnesses:
GEORGE M. FULLER,
DAVID K. GRAVES.